United States Patent
Moon et al.

(10) Patent No.: US 6,532,252 B1
(45) Date of Patent: Mar. 11, 2003

(54) DEVICE AND METHOD FOR MEASURING NON-ORTHOGONAL NOISE POWER FOR CDMA COMMUNICATION SYSTEM

(75) Inventors: Hi-Chan Moon, Seoul (KR); Jong-Han Kim, Yongin-shi (KR)

(73) Assignee: Samsung Electronics, Co., Ltd. (KR)

( * ) Notice: Subject to any disclaimer, the term of this patent is extended or adjusted under 35 U.S.C. 154(b) by 0 days.

(21) Appl. No.: 09/332,672

(22) Filed: Jun. 14, 1999

(30) Foreign Application Priority Data

Jun. 13, 1998 (KR) .............................. 98-22215

(51) Int. Cl.⁷ .............................................. H04B 17/00
(52) U.S. Cl. ...................... 375/144; 375/148; 375/227; 370/252
(58) Field of Search ................................ 375/144, 148, 375/224, 227, 285, 346; 370/252, 335, 342; 455/67.3, 67.4, 67.1, 63

(56) References Cited

U.S. PATENT DOCUMENTS 5,966,370 A * 10/1999 Gunzelmann ............... 370/320
6,275,485 B1 * 8/2001 Padovani ..................... 370/342

* cited by examiner

*Primary Examiner*—Amanda T. Le
(74) *Attorney, Agent, or Firm*—Dilworth & Barrese, LLP

(57) ABSTRACT

A non-orthogonal noise detecting device for a CDMA communication system. In the device, a despreader despreads multiple channel signals including a specific channel with an orthogonal code assigned to the specific channel repeating at least two same second symbols at a given first symbol duration, to generate despread repeated symbols. A difference signal generator receives the despread second symbols, and generates a difference signal between a presently received second symbol and a previously received second symbol. A noise detector converts the difference signal to an energy value to generate a non-orthogonal noise signal.

26 Claims, 10 Drawing Sheets

DEVICE AND METHOD FOR MEASURING NON-ORTHOGONAL NOISE POWER FOR CDMA COMMUNICATION SYSTEM

BACKGROUND OF THE INVENTION

1. Field of the Invention

The present invention relates generally to a receiving device and method for CDMA communication systems, and in particular, to a device and method for measuring non-orthogonal noise power of a received channel signal.

2. Description of the Related Art

Code division multiple access (CDMA) communication systems use orthogonal codes for channel separation. In particular, a forward link typically employs a synchronous CDMA technique which separates users with the orthogonal codes. In a non-multi-path environment, there is no interference among the channels using different orthogonal codes. Even in the multi-path environment, an orthogonality among the respective channels is maintained with respect to the multi-path signal components. Therefore, although some of the signals input to the respective fingers act as interference, most of the signals do not act as interference.

Accordingly, to implement an effective CDMA communication system, it is necessary to accurately measure the signal components acting as interference, i.e., non-orthogonal noise power. The measured non-orthogonal noise power can be used to determine a signal-to-interference ratio (SIR) for controlling gains of the fingers in a receiving device.

A method for measuring the non-orthogonal noise power is disclosed in U.S. Pat. No. 5,559,790 (hereinafter "the '790 patent") issued to Yano et al. In the disclosed non-orthogonal noise measuring method, a specified orthogonal code from the available orthogonal codes for the forward link is not assigned to the forward link. A base station sends information about the non-assigned orthogonal code to the mobile stations. The mobile stations then despread the received channel signal on the forward link with the assigned orthogonal codes, and calculate the energy component of the despread channel signal to detect a non-orthogonal noise component.

In the configuration described in the '790 patent, since a specific orthogonal code is assigned to the forward link for measurement of the non-orthogonal noise power, the specific orthogonal code cannot be used for the other channels. That is, even when additional orthogonal codes may be required to increase the efficiency of the forward link, the specified orthogonal code cannot be used. Furthermore, in the IS-95 standard, it is impossible to use the specific code in measuring the non-orthogonal noise power.

In addition, U.S. Pat. No. 5,754,533 issued to Bender et al. discloses another non-orthogonal noise measuring method wherein a receiving device estimates the energy detected by despreading a received signal on a channel having a low signal power as a non-orthogonal noise component (or power). Here, the channel having the low signal power is an IS-95 sync channel. However, this non-orthogonal noise measuring method estimates a value obtained by adding a sync channel data signal component, no matter how low it is, to the non-orthogonal noise power. So, it is impossible to accurately measure the non-orthogonal noise power.

SUMMARY OF THE INVENTION

It is, therefore, an object of the present invention to provide a device and method for measuring, at a receiving device, a non-orthogonal noise component included in a signal transmitted from a transmitting device in a CDMA communication system.

It is another object of the present invention to provide a device and method for measuring a non-orthogonal noise component from a repetition pattern for a channel where the same data is repeated, in a CDMA communication system.

It is a further object of the present invention to provide a device and method for measuring a non-orthogonal noise component from a repetition pattern for a traffic channel of low rate, in a CDMA communication system.

To achieve the above objects, there is provided a non-orthogonal noise detecting device for a CDMA communication system. The device comprises a despreader for despreading multiple channel signals including a specific channel with an orthogonal code assigned to the specific channel repeating at least two same second symbols at a given first symbol duration, to generate despread repeated symbols; a difference signal generator for receiving the despread second symbols, and generating a difference signal between a presently received second symbol and a previously received signal second symbol; and a noise detector for converting the difference signal to an energy value to generate a non-orthogonal noise signal.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

The present invention is directed to measuring non-orthogonal noise power acting as interference noise to respective fingers in a CDMA communication system. It is assumed for each of the described embodiments that a forward link channel reception device, for receiving a signal output from a forward link channel transmission device, measures the non-orthogonal noise included in the received signal.

In the forward link, even though the respective channels are spread with orthogonal codes to prevent interference, some of the signals may function as interference due to multi-path. Here, the interference signal is representative of a non-orthogonal component, and an accurate measurement of the non-orthogonal noise component is very important in designing a receiver. Accordingly, to measure a non-orthogonal noise component, the embodiment uses a forward link channel where the same data (i.e., all zeros or all ones) not including specific information (i.e., exclusive of data and voice) is transmitted. A low rate traffic channel may also be used where the same data symbol is repeated. For example, the forward link channel repeating the same data with no specific information may be a pilot channel, and the low rate channel repeating the same data symbol may be a sync channel. Accordingly, a non-orthogonal noise measuring method according to the present invention can assign all the available orthogonal codes for the system as orthogonal codes tp separate the channels. That is, in accordance with the present method, there is no need to dedicate one ore more orthogonal codes for the purpose of measuring a non-orthogonal noise component as is performed in the prior art.

Figure 1:
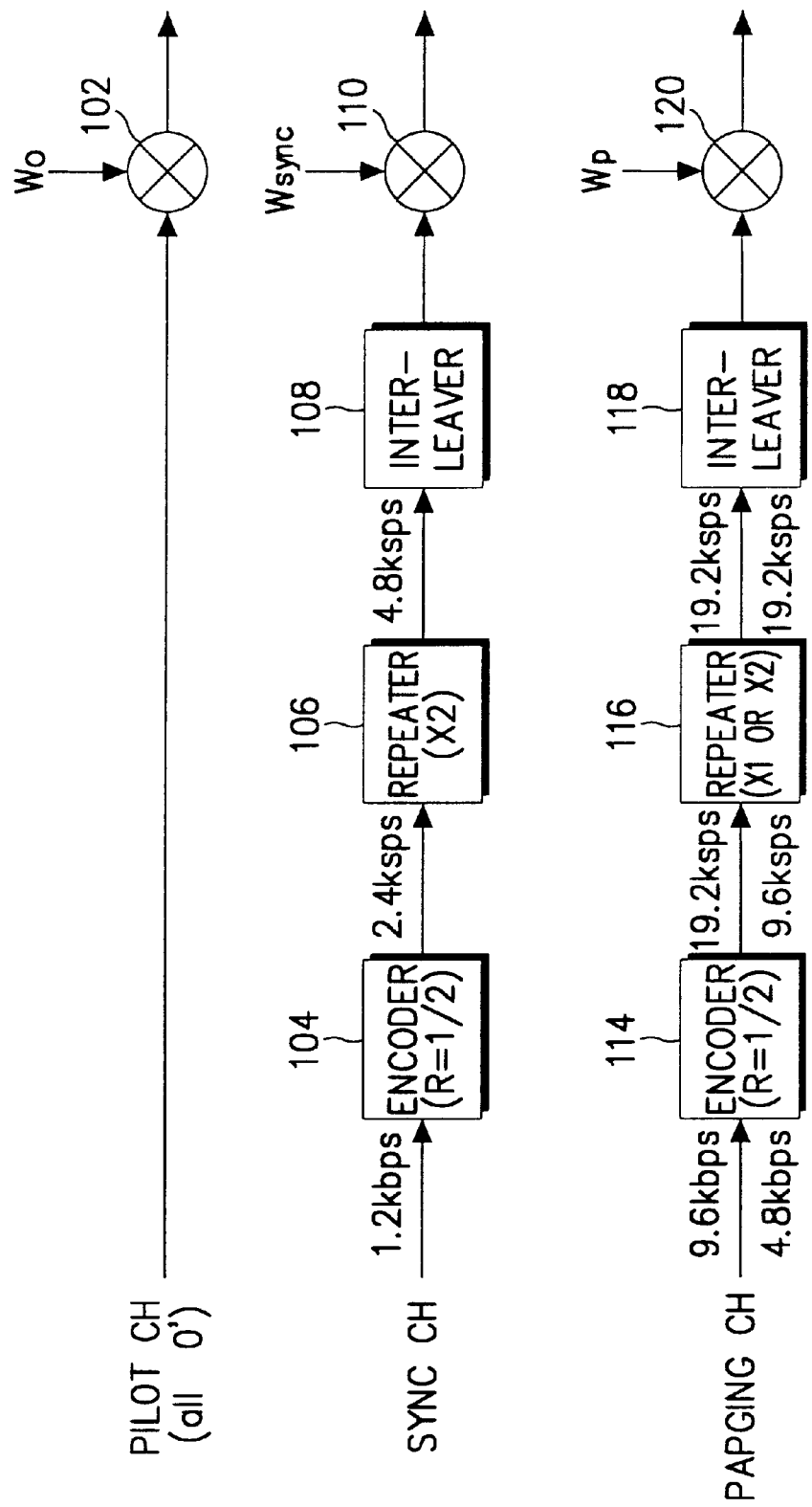
FIG. 1 is a diagram illustrating a channel transmission device for transmitting a non-orthogonal noise component in a CDMA communication system according to an embodiment of the present invention.

With reference to FIG. 1, there is illustrated a channel transmission device for a forward link and three channels including a pilot channel not including specific information in an IS-95 system, a low rate sync channel repeating the same symbols, and a traffic channel.

In FIG. 1, the pilot channel comprises all "0"s (i.e., not including specific information). A spreader 102 multiplies the pilot signal by an orthogonal code for the pilot channel to generate an orthogonally spread pilot signal. The sync channel includes sync channel information, but outputs data at a low rate of 1.2 Kbps. The 1.2 Kbps signal on the sync channel is encoded by an encoder 104. A convolutional encoder having a coding rate R=½ can be used for the encoder 104. In this case, the 1.2 Kbps sync channel signal is encoded into 2.4 Ksps (symbols per second). A symbol repeater 106 repeats the symbols twice on the sync channel output from the encoder 104. An interleaver 108 interleaves the symbols on the sync channel outputted from the symbol repeater 106 to prevent a burst error. A block interleaver can be used for the interleaver 108. A spreader 110 multiplies the sync channel signal output from the interleaver 108 by an orthogonal code assigned for the sync channel to generate an orthogonally spread sync channel signal.

The forward link also includes traffic channels which establish an exclusive link between a base station and a specific mobile station for transmission of data and voice, and a paging channel which is a common channel used when a base station pages a specific mobile station prior to a call setup. Here, the channel for actually transmitting data is called a traffic channel. There is various traffic channel in a CDMA system for transport voice, text, image, facsimile and moving picture data. In the embodiment, it is assumed that the traffic channel is a paging channel. The traffic channel has a data rate of 19.2 Ksps or 9.6 Ksps.

The paging channel is a channel for actually transmitting data to a mobile station, and outputs data at a higher rate than the sync channel. The 9.6 Kbps (or 4.8Kbps) signal on the paging channel is encoded by an encoder 114, for which an R=½ convolutional code can be used. In this case, the 9.6 Kbps (or 4.8 Kbps) paging channel signal is encoded into 19.2 Ksps (or 9.6 Ksps) symbols. A symbol repeater 116 repeats one time (or two times) the symbols on the paging channel output from the encoder 114. An interleaver 118 interleaves the symbols on the paging channel outputted from the symbol repeater 116 to prevent a burst error. A block interleaver can be used for the interleaver 118. A spreader 120 multiplies the paging channel signal output from the interleaver 118 by an orthogonal code assigned for the paging channel to generate an orthogonally spread paging channel signal.

It is noted from the foregoing that a final symbol rate of the sync channel is 4.8 Ksps, which is ¼ times a symbol rate (19.2 Ksps) of the traffic channel. Accordingly, to match the data rate, 4 symbols of a short period are repeated. Herein, a method for effectively measuring the non-orthogonal noise component will be described with reference to the sync channel, which repeats the same symbols. In accordance with the method of the present invention, a forward link reception device then measures the non-orthogonal noise component using the sync channel which repeat the same symbols.

Figure 2:
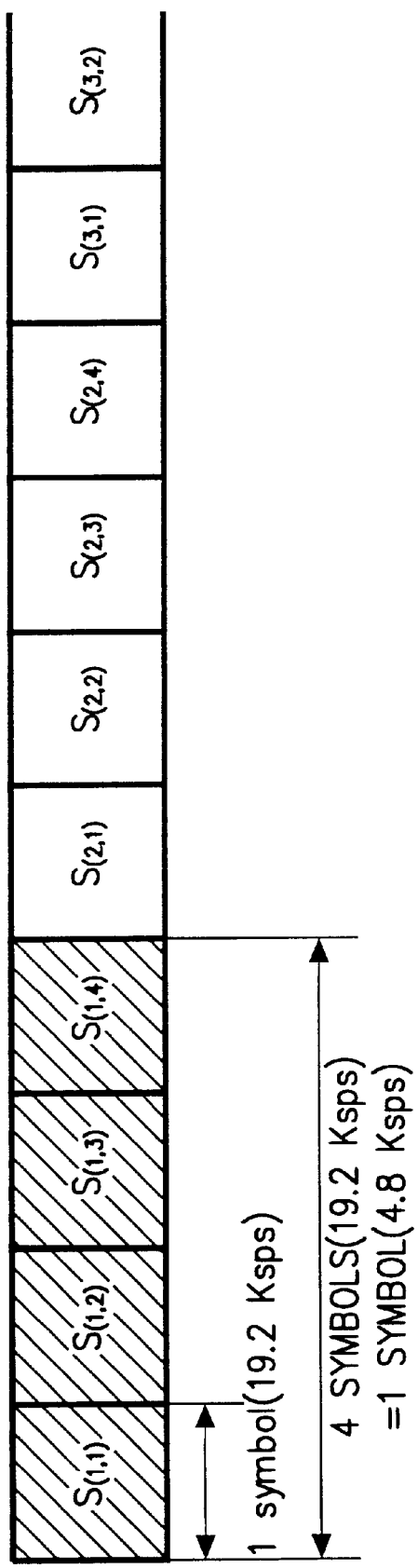
FIG. 2 is a diagram illustrating a symbol structure for a channel used in measuring non-orthogonal noise power in a channel transmission device of FIG. 1.

With reference to FIG. 2, there is shown a sync channel for the IS-95 forward link, which is despread with an orthogonal code. In FIG. 2, despread symbols $S_{(n,1)}, \ldots, S_{(n,4)}$ constitute one sync channel symbol unit, which corresponds to 4 short-period symbols. That is, when one sync channel symbol is transmitted at 4.8 Ksps and one traffic channel symbol is transmitted at 19.2 Ksps, four traffic channel symbols can be transmitted for one-sync channel symbol duration. Herein, the synch channel symbol is referred to as a first symbol and the traffic channel symbol is referred to as a second symbol. All of the 4 second symbols divided at a first symbol duration of the sync channel maintain the same value. As such, the first two second symbol values subtracted from the next two short-period symbol values will always become zero. However, in the case where the symbols on the sync channel are corrupted from interference signals, the non-orthogonal noise component can be detected by performing the same difference calculation, namely, a difference between the first two second symbols and the following two symbols.

The calculation is described by Equation 1 below. From the received signal on the sync channel, a non-orthogonal noise component can be calculated by $$\text{Non-orthogonal noise power} = (I_{2n} - I_{2n-1})^2 + (Q_{2n} - Q_{2n-1})^2 \quad \text{[Equation 1]}$$

where $I_n$ and $Q_n$ represent symbol values for I-channel and Q-channel of the received complex signal, respectively.

Figure 3:
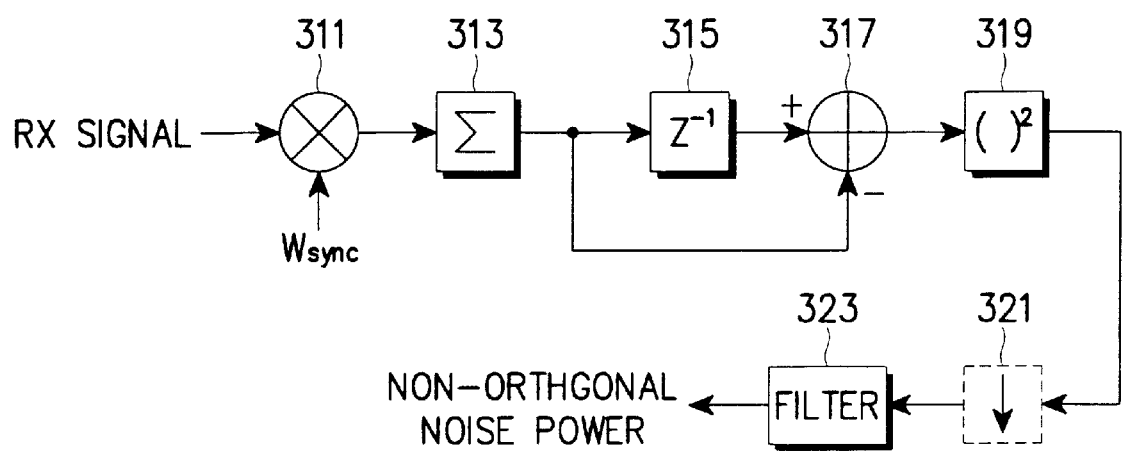
FIG. 3 is a diagram illustrating a channel reception device for measuring non-orthogonal noise power in a CDMA communication system according to an embodiment of the present invention.

With reference to FIG. 3, there is illustrated a receiver for measuring a non-orthogonal noise component using Equation 1. Referring to FIG. 3, a despreader 311 multiplies a received signal by an orthogonal code assigned to a specific channel, to despread an orthogonally spread signal. The specific channel can be a channel not carrying specific information or a low rate channel repeating the same data. In the embodiment, the specific channel is assumed to be a sync channel (i.e., low data rate channel).

In this case, the despreader 311 despreads a received spread sync channel signal by multiplying the received signal by an orthogonal code assigned to the sync channel. An accumulator 313 accumulates the sync channel signals (or first symbol) output from the despreader 311 each traffic channel symbol period. Here, one sync channel symbol duration (or first symbol) can be four traffic channel symbols (or second symbols) duration, which are $S_{(n,1)}$, $S_{(n,2)}$, $S_{(n,3)}$, and $S_{(n,4)}$ as shown in FIG. 2. A delay 315 delays an output signal of the accumulator 313 by one symbol period. A subtracter 317 subtracts a present sync channel symbol value outputted from the accumulator 313 from a previous sync channel symbol value output from the delay 315, to calculate a difference between the two symbols. A squarer 319 squares the difference value between the two symbols, output from the subtracter 317, to detect power of the noise component. A down-sampler 321 down-samples the non-orthogonal noise component between specific symbols, output from the squarer 319. Also, the down-sampler 321 selects non-orthogonal noise power between the specific symbols from the output of the squarer 319. That is, for the case of FIG. 2, a value determined according to a difference between the symbols $S_{(n,1)}$ and $S_{(n,2)}$ is not selected as non-orthogonal noise power. The squarer 319 selects the non-orthogonal noise power detected at a boundary between the symbol durations (for example, $S_{(1,4)}$ and $S_{(2,1)}$; $S_{(2,4)}$ and $S_{(3,1)}$; . . . ; $S_{(n,4)}$ and $S_{(1,1)}$. A filter 323 bandpass filters the non-orthogo noise power output from the down-sampler 321. The filter 323 can be composed of an IIR (Infinite Impulse Response) or FIR (Finite Impulse Response) filters to attain an appropriate bandwidth.

In operation, the receiver described at FIG. 3 receives a PN (Pseudo-random Noise) despread baseband signal and multiplies the signal by an orthogonal code for the sync channel to be despread and converted to a symbol unit signal at the despreader 311 and the accumulator 313. Here, the symbol unit becomes the traffic channel symbol, not the sync channel symbol. Therefore, the sync channel symbol is divided into four traffic channels and accumulated.The converted symbol-unit signals are provided to the delay 315 and the subtracter 317. The subtracter 317 then calculates the difference between the present symbol and the previous symbol delayed by the delay 315. The output value of the subtracter 317 becomes the non-orthogonal noise component, which is provided to the squarer 319 to calculate the non-orthogonal noise power. The squarer 319 squares the subtracted values for the I- and Q-channels to generate the non-orthogonal noise power. The down-sampler 321 selecting an output of the squarer 319 in units of two symbols to select a non-orthogonal noise signal. Here, the down-sampler 321 should not select the non-orthogonal noise power calculated at the symbol boundary of the sync channel. When the sync channel symbols are changed (e.g., $S_{(1,4)}$ and $S_{(2,1)}$), the symbol values are changed. Therefore, energy detected at this time is not the pure non-orthogonal noise power. Therefore, the down-sampler 321 selects only the non-orthogonal noise power detected at the same sync channel symbol duration. The output of the down-sampler 321 is provided to the filter 323, which controls a bandwidth of the non-orthogonal noise component. The filter 323 bandpass filters the non-orthogonal noise component to output the non-orthogonal noise value at specified periods.

While a description has been provided for the case where the low rate channel used in measuring the non-orthogonal noise component repeats the same data, the same measuring method can be applied to the case where a transmitter transmits a specific pattern without repeating the same data (e.g., all zeros or all ones). This is illustrated in FIGS. 4A and 4B.

First, a description will be made regarding an operation of a transmitter with reference to FIG. 4A. A channel 401 to be transmitted is a channel having a low data rate of 1.2 Kbps. A 1.2 Kbps signal on the low rate channel is encoded by an encoder 402, for which an R=½ convolutional encoder can be used. In this case, the low rate signal of 1.2 Kbps is encoded into 2.4 Ksps symbols. A symbol repeater 403 repeats two times the low rate channel symbols output from the encoder 402 to output 4.8 K symbols per second. An interleaver 404 interleaves the low rate channel symbols outputted from the symbol repeater 403 to prevent a burst error. A block interleaver can be used for the interleaver 404. A multiplier 406 multiplies an output of the interleaver 404 by an output of a pattern generator 405. Here, the pattern generator 405 and the multiplier 406 constitute an inserter. A spreader 408 multiplies a low rate channel signal outputted from the multiplier 406 by an orthogonal code assigned to the low rate channel to generate an orthogonally spread signal.

Next, a description will be provided regarding an operation of a receiver with reference to FIG. 4B. A despreader 411 multiplies a received signal by an orthogonal code assigned to a specific channel to despread the orthogonally spread signal received from the transmitter. An accumulator 412 accumulates the low rate channel signals outputted from the despreader 411 at periods of one symbol. Here, the accumulator 412 accumulates the low rate channel symbols by accumulating the signal despread at one low rate channel symbol duration in a unit of a high rate channel symbol duration. A pattern generator 413 generates the same pattern as that of the pattern generator 405 in the transmitter. A multiplier 414 multiplies an output of the accumulator 412 by an output of the pattern generator 413. Here, the multiplier 414 and the pattern generator 413 constitute a pattern detector. A delay 415 delays an output signal of the multiplier 414 by one symbol period. A subtracter 416 subtracts a present low rate channel symbol value output from the multiplier 414 from a previous low rate channel symbol value output from the delay 415, to calculate a difference between the two symbols. A squarer 417 squares the difference value between the two symbols, output from the subtracter 416, to detect the non-orthogonal noise power. A down-sampler 418 down-samples the noise power, output from the squarer 417. Also, the squarer 418 selects the non-orthogonal noise power between the specific symbols from the output of the squarer 417. In this case, the down-sampler 418 should not select the non-orthogonal noise components generated at the boundary of the low rate channel symbol. A filter 419 bandpass filters the non-orthogonal noise power output from the down-sampler 418. The filter 419 can be composed of an IIR (Infinite Impulse Response) or FIR (Finite Impulse Response) filters to attain an appropriate bandwidth.

In operation, the received signal being a PN despread baseband signal is multiplexed by an orthogonal code for the sync channel to be despread at the despreader 411, and the despread low rate channel symbols are converted and accumulated in a unit of high rate channel symbol duration at the accumulator 412. The converted symbol unit signals are multiplied, at the multiplier 414, by the same pattern as that used in the transmitter. An output of the multiplier 414 is provided in common to the delay 415 and the subtracter 416. The subtracter 416 then subtracts the present symbol from the previous symbol output from the delay 415 to calculate the difference between the two symbols. Here, the difference value output from the subtracter 416 becomes a non-orthogonal noise component, which is inputted to the squarer 417 to calculate the non-orthogonal noise power. The square 417 squares the difference values for the I and Q-channels to generate the non-orthogonal noise power. The down-sampler 418 has the function of detecting an output of the squarer 417 in the unit of two symbols. An output of the down-sampler 418 is applied to the filter 419 which controls a bandwidth of the non-orthogonal noise component. The filter 419 bandpass filters the non-orthogonal noise component to output non-orthogonal noise power at periods of a specific duration.

Figure 10:
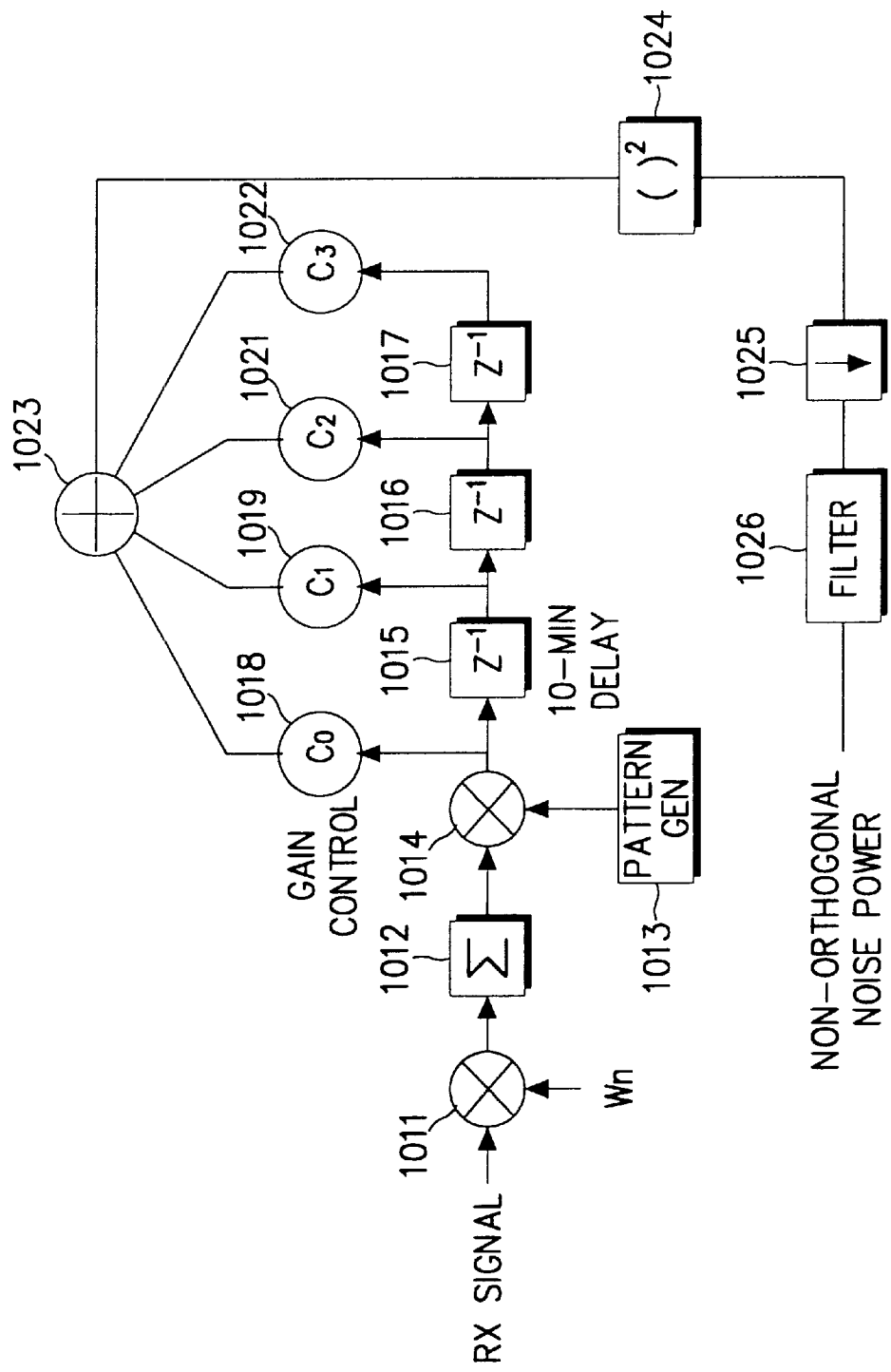
FIG. 10 shows a receiver for measuring non-orthogonal noise power according to another embodiment of the present invention.

FIG. 10 shows a receiver for measuring non-orthogonal noise power according to another embodiment of the present invention. A despreader 1011 despreads an orthogonally spread signal by multiplying a received signal by an orthogonal code assigned to a specific channel. Specifically, the despreader 1011 despreads the received spread low rate channel signal by multiplying the received signal by an orthogonal code assigned to the specific channel. An accumulator 1012 accumulates the low rate channel signal output from the despreader 1011 in a unit of one symbol. Here, the accumulator 1012 accumulates the despread low rate channel symbols by accumulating the signal despread at one low rate channel symbol duration in a unit of a high rate channel symbol duration. A specific pattern generator 1013 generates the same pattern as that of the pattern generator 405 in the transmitter. A multiplier 1014 multiplies an output of the accumulator 1012 by an output of the pattern generator 1013. Here, the multiplier 1014 and the pattern generator 1013 constitute a pattern detector. An operation hereto is the same as that of the receiving device of FIG. 4.

The despread symbols are provided to a delay 1015 and a gain controller 1018. The receiver of FIG. 10 includes delays capable of storing several despread symbols to store symbols as many as the last received repeated symbol NUM_SYM. To receive symbols of the sync channel shown in FIG. 2, the receiver of FIG. 10 may include three delays 1015, 1016 and 1017. In this case, the delays 1015, 1016 and 1017 each have three delay elements so that they can store three previous symbols with respect to a present symbol. Here, the number of the delay elements is equal to or lower than a frequency of transmissions.

For convenience, a present despread symbol will be referred to as Xn, a one-symbol previous symbol Xn-1, a two-symbol previous symbol Xn-2 and a three-symbol previous symbol Xn-3. In this manner, a k-symbol previous symbol will be referred to as Xn-k. Then, a present input symbol and symbols stored in the delays 1015–1017 are multiplied at the gain controllers 1018–1022 by corresponding gain control values $C_0$–$C_3$, respectively, and then added at an adder 1023. An output of the adder 1023 can be defined as:

$$Yn = C_0 * Xn + C_1 * Xn-1 + \ldots + C_k * Xn-k \quad \text{[Equation 2]}$$

In Equation 2, gain control values are set to be $C_0 + C_1 + \ldots + C_k = 0$. Since the transmitter repeats data symbols several times before transmission, the value Yn of Equation 2 should be zero in a noise-less environment.

In the embodiment of FIG. 10, since k=3, Equation 2 can be rewritten as:

$$Yn = C_0 * Xn + C_1 * Xn-1 + C_2 * Xn-2 + C_3 C_0 + C_1 + C_3 = 0$$

The Yn value calculated at the last symbol of the above repetitive duration should be zero in the noise-less environment. However, when the received symbol includes a non-orthogonal noise component, the value Yn may have a non-zero value due to the non-orthogonal noise component. In this case, the non-orthogonal noise power required by the receiver can be calculated squaring the value Yn and averaging the squared value for a predetermined time.

Although a description has been made regarding a case where non-orthogonal noise power is calculated depending on only the Yn value in the embodiment of FIG. 10, it is also possible to measure the non-orthogonal noise power by calculating Yn' using other coefficients $C_0'$, $C_1'$, $C_2'$, $C_3'$ ($C_0' + C_1' + C_2' + C_3' = 0$). In this case, although complexity and calculations of the receiver increase, it is possible to measure the non-orthogonal noise power more accurately.

A squarer 1024 squares the value Yn output from the adder 1023 to detect energy of the non-orthogonal noise component. A down-sampler 1025 then down-samples noises among specific symbols, output from the squarer 1024. From an output of the squarer 1024, the down-sampler 1025 selects the specific symbols and the non-orthogonal noise power among the symbols. In this case, the down-sampler 1025 should not select the non-orthogonal noise components generated at the boundary of the low rate channel. A filter 1026 bandpass filters an output of the down-sampler 1025 to output the non-orthogonal noise power.

Figure 5:
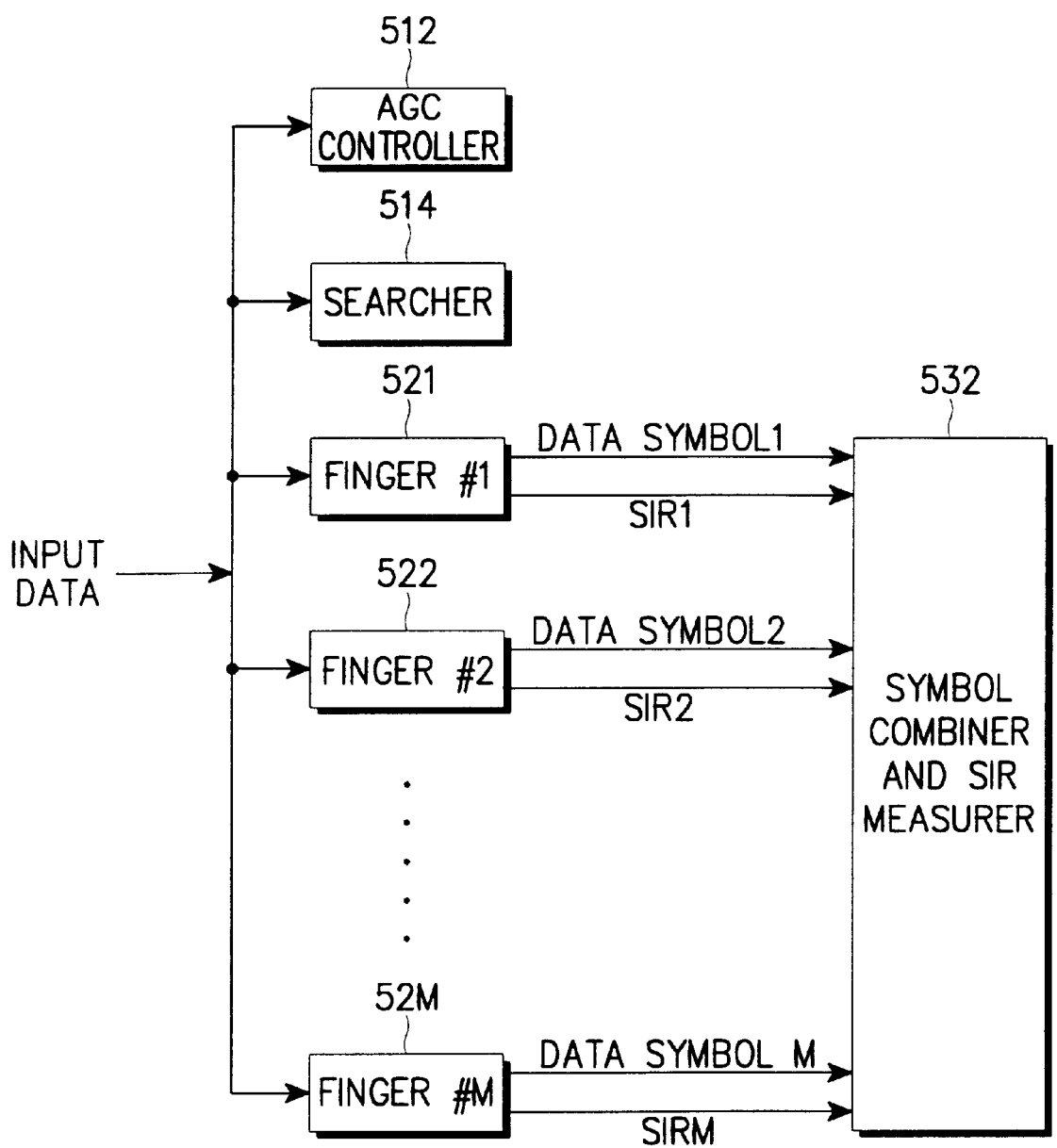
FIG. 5 is a diagram illustrating a mobile station reception device for determining a power control command depending on the non-orthogonal noise power according to an embodiment of the present invention.

With reference to FIG. 5, there is illustrated a baseband receiver which processes complex signals including I and Q-channel components. For convenience, a detailed description of the baseband receiver will be avoided herein. The baseband receiver includes an automatic gain controller (AGC) 512, a searcher 514, M fingers 521–52M, a combiner and a signal-to-interference ratio SIR measurer 532.

The AGC controller 512 measures the energy of an input signal to generate a gain control signal for controlling a gain of an AGC amplifier. A searcher 514 searches for a high-power multi-path component to which a finger is to be assigned after initial acquisition and cell search. The fingers 521–52M demodulate multi-path components assigned by the searcher 514 and measure local SIRs of the demodulated multi-path components. The combiner and SIR measurer 532 combines the local SIRs calculated by the fingers 521–52M to calculate an effective SIR of the overall receiver, to determine a power control command.

In the SIR measuring and power control method, the respective fingers 521–52M in the receiver, despreads the received signals with the orthogonal codes assigned to the corresponding channels to measure interference components, and calculate the local SIRs. The combiner and SIR measurer 532 then calculates the effective SIR of the receiver by combining the local SIRs of the respective fingers 521–52M. The effective SIR is then compared with a threshold. Based on the comparison, when the SIR is higher than the threshold, a power-down command for decreasing the forward link is generated; when the SIR is lower than the threshold, a power-up command is generated for increasing the forward link.

A. First Embodiment

Figure 6:
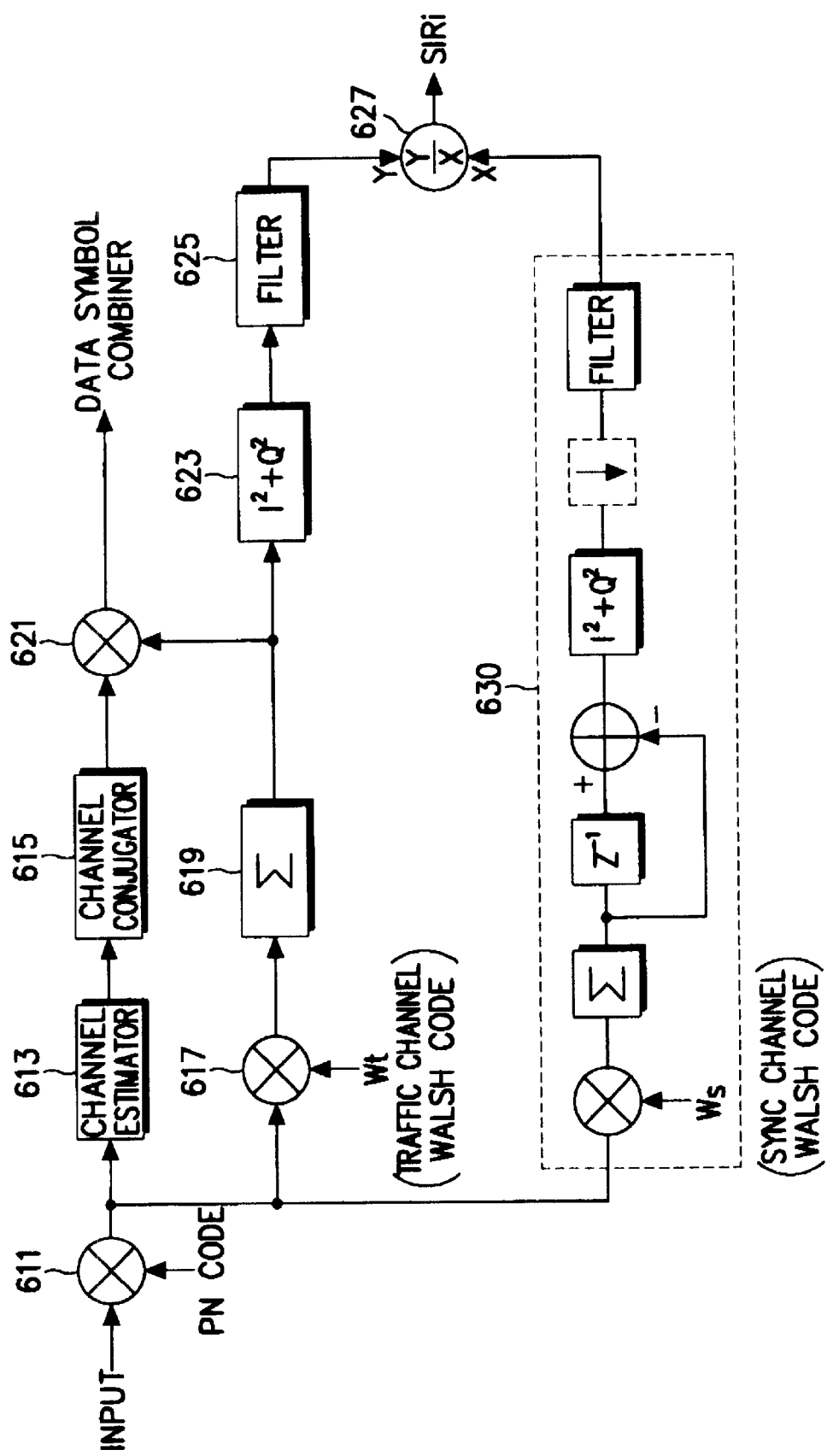
FIG. 6 is a diagram illustrating a finger of FIG. 5 according to a first embodiment of the present invention.

With reference to FIG. 6, there is a detailed illustration of a finger for measuring an SIR by measuring the energy of an input component of a received signal. In FIG. 6, all the signals are complex signals.

Referring to FIG. 6, a multiplier 611 despreads an input signal by mixing the input signal with a PN sequence. A channel estimator 613 estimates the strength and phase of a multi-path channel response from the despread pilot signal. A complex conjugator 615 complex conjugates an output of the channel estimator 613. A multiplier 617 multiplies an output of the multiplier 611 by a Walsh code for the traffic channel, to extract the traffic channel data. An accumulator 619 accumulates the traffic channel signal output from the multiplier 617 in the symbol unit to output an intended data component. A multiplier 621 multiplies an output of the complex conjugator 615 by an output of the accumulator 619 to output data symbols to the symbol combiner 531.

A signal energy detector 623 squares the respective signal components output from the accumulator 619 ($I^2+Q^2$) to calculate the signal energy. A filter 625 filters the signal energy outputted from the signal energy detector 623 to output a received signal component of the corresponding finger.

Figure 4:
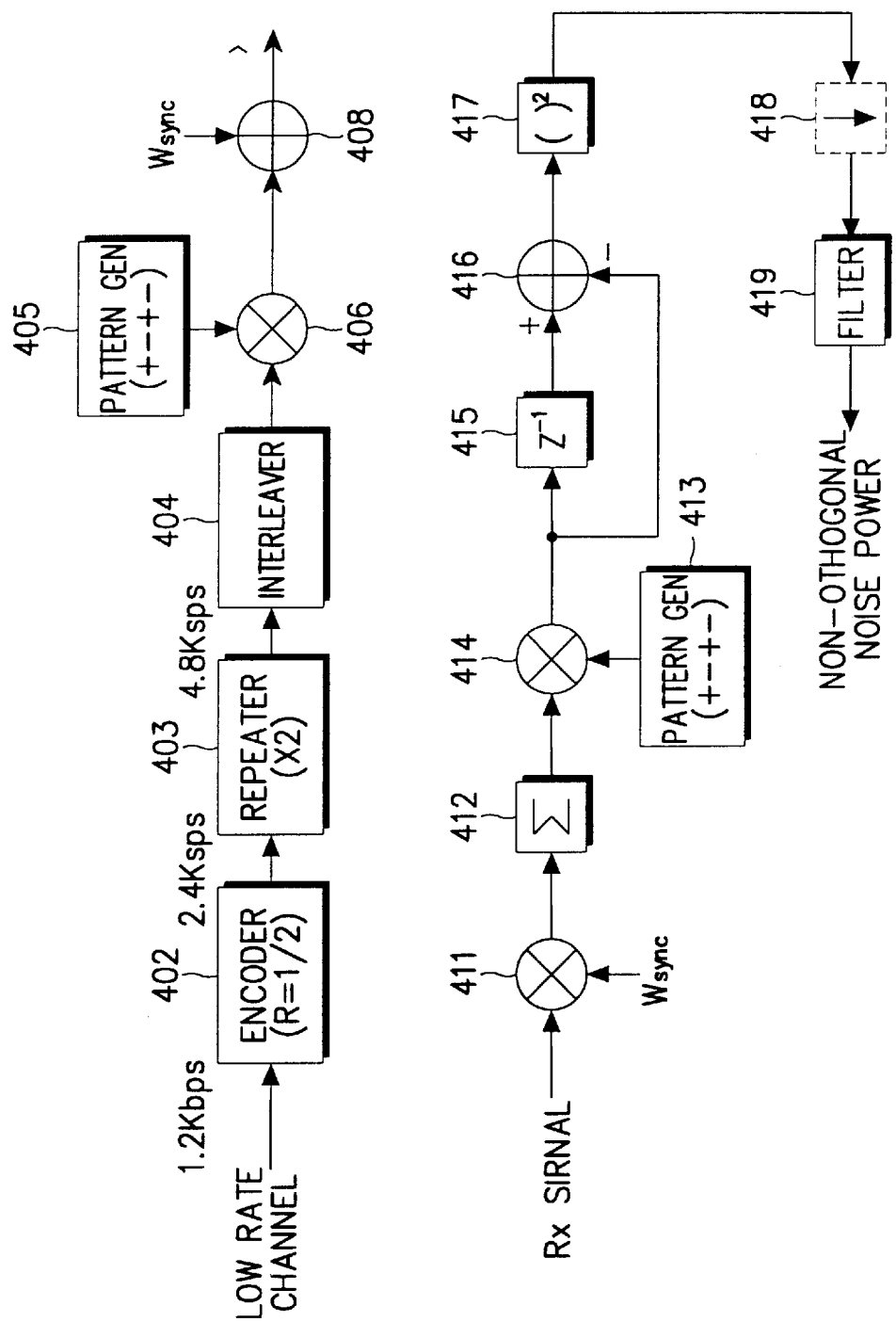
FIGS. 4 is a diagram illustrating channel transmission and reception devices for measuring non-orthogonal noise power in a CDMA communication system according to another embodiment of the present invention.

Interference power is detected by a non-orthogonal noise measurer 630 having the same structure as illustrated in FIGS. 3 and 4. In FIG. 6, the non-orthogonal noise measurer 630 employs the configuration of FIG. 3. The non-orthogonal noise component measured by the non-orthogonal noise measurer 630 is provided to a demultiplier 627 which demultiplies (or divides) a signal component by the non-orthogonal noise component output from the filter 625 to generate a local SIR signal of the corresponding finger.

As described above, the finger of FIG. 6 calculates the symbol energy of the traffic channel, filters the calculated symbol energy and calculates the signal component. Further, the finger detects the non-orthogonal noise component according to the present invention and then, divides the non-orthogonal noise power by the signal power to calculate the local SIR.

Figure 7:
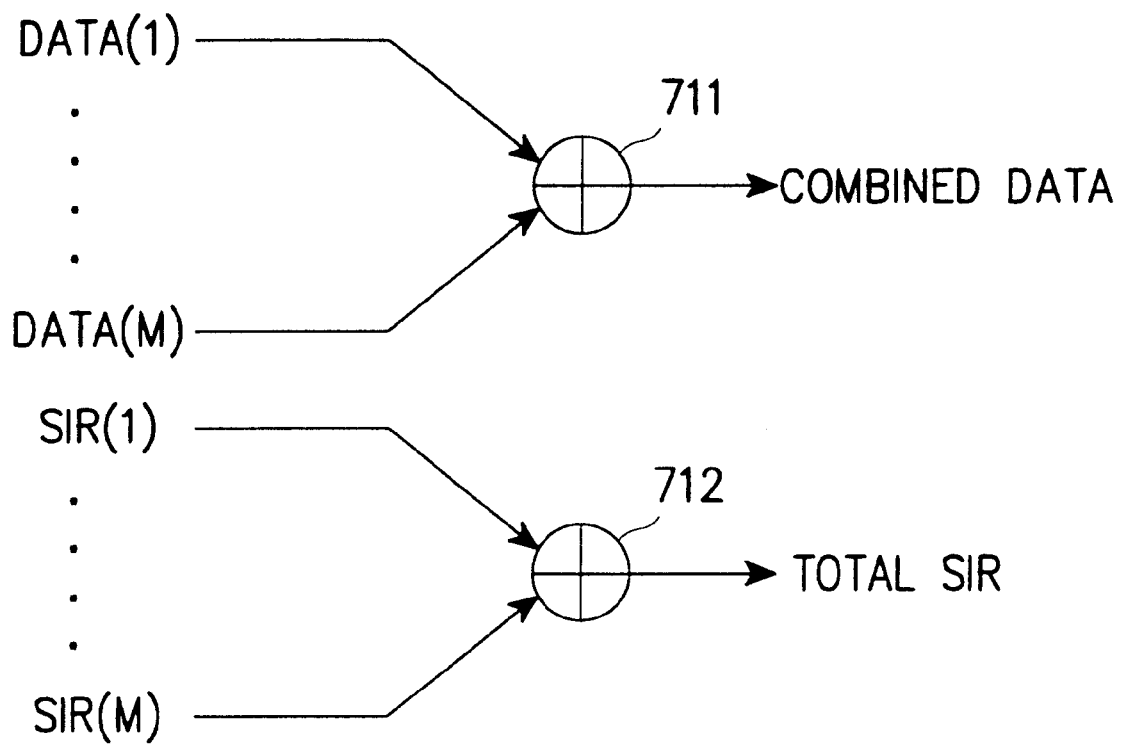
FIG. 7 is a diagram illustrating a symbol combiner and SIR measurer of FIG. 5 when the fingers have the structure of FIG. 6.

With reference to FIG. 7, there is provided a detailed illustration of the symbol combiner and SIR measurer 532 when the fingers have the structure of FIG. 6. Referring to FIG. 7, an adder (or XOR gate) 711 combines data symbols output from the respective fingers 521–52M. An adder (or XOR gate) 712 adds the local (i.e., SIRs SIR1-SIRM) output from the respective fingers 521–52M to output a total SIR, which is compared with a threshold to determine a power control command. That is, in the symbol combiner and SIR measurer 532, the adder 712 adds the local SIRs measured by the respective fingers 521–52M to measure an effective SIR of the overall mobile station receiver. Further, the effective SIR is compared with a threshold. In accordance with the comparison, when the effective SIR is higher than the threshold, a power-down command for the forward link is generated; when the effective SIR is lower than the threshold, a power-up command for the forward link is generated.

In an IS-95 forward link, a pilot channel is transmitted via a forward channel to assist in initial acquisition and data demodulation, and a traffic channel sends a power control command via a reverse link at periods of 1.2 msec by puncturing-after-insertion.

A mobile station may measure the signal power based on a power control command transmitted via the forward link. In the above SIR measuring method, it is possible to calculate traffic channel power depending on only energy of the power control command upon detection of a traffic signal.

While FIGS. 6 and 7 illustrate the case where the measured local SIRs of the respective fingers are combined, it is also possible to measure the SIR after combining signals of the respective fingers at the signal combiner.

B. Second Embodiment

Figure 8:
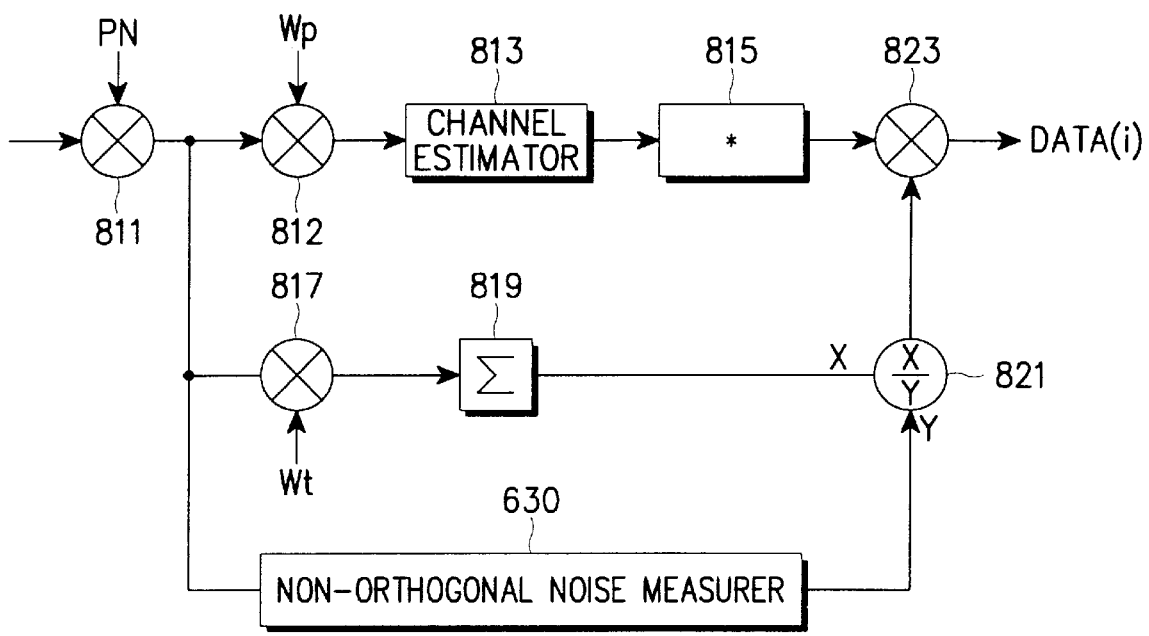
FIG. 8 is a diagram illustrating a finger of FIG. 5 according to a second embodiment of the present invention.

With reference to FIG. 8, there is illustrated in detail a finger for measuring an SIR. In this embodiment, a signal gain input to the symbol combiner is controlled according to the interference measured by a non-orthogonal noise measurer.

Referring to FIG. 8, a multiplier 811 despreads an input signal by mixing the input signal with a PN sequence. A multiplier 812 multiplies a despread signal outputted from the multiplier 811 by an orthogonal code for the pilot channel to separate a pilot signal. A channel estimator 813 estimates the strength and phase of a multi-path channel response signal being demodulated by the finger from the output of the multiplier 811. A complex conjugator 815 complex conjugates an output of the channel estimator 813. A multiplier 823 multiplies an output of a demultiplier 821 by an output of the complex conjugator 815 and provides its output to the symbol combiner and SIR measurer 532.

A multiplier 817 multiplies the despread signal output from the multiplier 811 by an orthogonal code assigned to the traffic channel to separate a traffic channel signal. An accumulator 819 accumulates the traffic channel signal output from the multiplier 817 in the symbol unit to output an indented data component, which is provided to the demultiplier 821.

Also, the despread signal output from the multiplier 811 is applied to a non-orthogonal noise measurer 630, which measures the non-orthogonal noise power in the above described manner and provides the measured non-orthogonal noise power to the demultiplier 821. Here, the non-orthogonal noise measurer 630 may have the structure of FIG. 3 or 4.

The demultiplier 821 divides the traffic signal power output from the accumulator 819 by the non-orthogonal noise power output from the non-orthogonal noise power measurer 630, to generate a local SIR signal of the corresponding finger. The output of the demultiplier 821 is provided to the multiplier 823.

Figure 9:
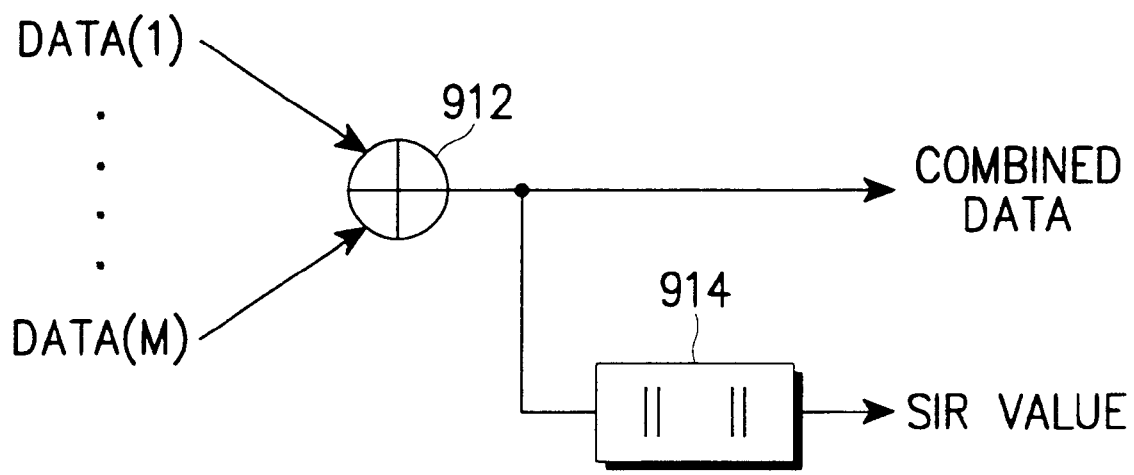
FIG. 9 is a diagram illustrating a symbol combiner and SIR measurer of FIG. 5 when the fingers have the structure of FIG. 8.

With reference to FIG. 9, there is illustrated a symbol combiner and SIR measurer 532 according to the second embodiment, which processes the outputs of the fingers having the structure of FIG. 8. Referring to FIG. 9, an adder (or XOR gate) 912 adds data values outputted from the fingers 521–52M, and a power detector 914 detects output power of the adder 912 and outputs the detected output power as an SIR value, which is compared with a threshold to generate a power control command for the forward link.

When measuring the SIR as illustrated in FIG. 9, a mobile station can measure the signal power based on the power control command transmitted via the forward link. In the above SIR measuring method, it is possible to calculate the traffic channel power depending on only the power control command upon detection of a traffic signal.

In summary, the non-orthogonal noise components detected by the non-orthogonal noise measurer can be used as an SIR to be measured in a reception device. Further, for forward link power control, the SIR measured in the reception device is compared with a threshold to determine whether to increase or decrease the forward link power. The SIRs measured at the respective fingers can be used in controlling gains of the fingers.

Although the present invention has been described with reference to the cases where the novel non-orthogonal noise measurer is applied to an IS-95 sync channel, it is equally applicable to a low rate traffic channel or a pilot channel repeating the same symbols, which have the similar characteristic to that of the IS-95 sync channel. In addition, the novel non-orthogonal noise measurer can also be applied to a $3^{rd}$ generation CDMA communication system.

As described above, the novel CDMA communication system measures non-orthogonal noise power using a forward channel having no specific information (i.e., no voice or data) or a low rate channel. This provides an effective non-orthogonal noise measuring method for a $3^{rd}$ generation CDMA communication system. An advantage of the present invention is that it can be applied to the IS-95 communication system without a modification in channel structure. In addition, the novel non-orthogonal noise measuring method can measure an accurate non-orthogonal noise component using all the orthogonal codes. So, it is possible to increase the performance of a reception device by increasing the accuracy of an SIR.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A non-orthogonal noise detecting device for a code division multiple access (CDMA) communication system, comprising:

a despreader for despreading multiple channel signals including a specific channel having an orthogonal code assigned thereto, the specific channel repeating at least two same second symbols in a given first symbol time duration, to yield despread repeated symbols;

a difference signal generator for receiving the at least two same despread second symbols, and generating a difference signal between a presently received second symbol and a previously received second symbol; and a noise detector for converting the difference signal to an energy value to generate a non-orthogonal noise signal.

2. The non-orthogonal noise detecting device as claimed in claim 1, wherein the despreader comprises:

an orthogonal demodulator for despreading the received channel signal with an orthogonal code assigned to a channel for transmitting the first symbol; and an accumulator for accumulating the symbols orthogonally modulated in a first symbol time duration in a unit of the second symbol.

3. The non-orthogonal noise detecting device as claimed in claim 2, wherein the difference signal generator comprises:

a delay for delaying the at least two same second symbols output from the despreader; and a subtracter for subtracting the second symbols output from the despreader from the delayed second symbols to generate the non-orthogonal noise component.

4. The non-orthogonal noise detecting device as claimed in claim 3, wherein the noise detector comprises:

a squarer for converting an output of the difference signal generator to an energy component; and a filter for filtering an output of the squarer in a noise band to generate the non-orthogonal noise signal.

5. The non-orthogonal noise detecting device as claimed in claim 1, further comprising a down-sampler connected to the noise detector, for down-sampling the non-orthogonal noise signal so as not to select an output generated at a boundary duration of the first symbol as a non-orthogonal noise.

6. The non-orthogonal noise detecting device as claimed in claim 5, wherein the first symbol is a sync channel symbol and the second symbol is a traffic channel symbol.

7. A non-orthogonal noise detecting device for a CDMA communication system, comprising:

a despreader for despreading a received signal with an orthogonal code for a sync channel;

an accumulator for accumulating the despread sync channel signal in a unit of traffic channel symbol duration;

a difference signal generator for delaying an output of the accumulator in a unit of traffic channel symbol duration and calculating a difference between the delayed traffic-duration symbol signal and the despread traffic-duration symbol signal;

a non-orthogonal noise detector for converting the difference signal to an energy component to generate a non-orthogonal noise component; and a down-sampler for receiving the non-orthogonal noise signals and down-sampling the received non-orthogonal signals so as not to select an output generated at a boundary of the sync channel symbol as a non-orthogonal noise.

8. A non-orthogonal noise detecting device for a CDMA communication system, comprising:

a despreader for despreading multiple channel signals including a specific channel with an orthogonal code assigned thereto, said specific channel repeating the same data, to generate despread repeated symbols;

a difference signal generator for receiving the despread repeated symbols, and detecting a difference between a presently received symbol and a previously received symbol; and a noise detector for converting the difference signal to an energy value to generate a non-orthogonal noise signal.

9. The non-orthogonal noise detecting device as claimed in claim 8, further comprising a down-sampler connected to the noise detector, for down-sampling the non-orthogonal noise signals.

10. The non-orthogonal noise detecting device as claimed in claim 8, wherein said specified channel repeating the same data is a pilot channel.

11. A non-orthogonal noise detecting method for a CDMA communication system, comprising the steps of:

despreading multiple channel signals including a specific channel with an orthogonal code assigned thereto, said specific channel repeating at least two same second symbols in a given first symbol time duration, to generate despread repeated second symbols;

receiving the despread repeated second symbols, and generating a difference signal as the difference between a presently received second symbol and a previously received second symbol; and converting the difference signal to an energy value to generate a non-orthogonal noise signal.

12. The non-orthogonal noise detecting method as claimed in claim 11, wherein the despreading step further comprising the steps of:

despreading the received channel signal with an orthogonal code assigned to a channel for transmitting the first symbol; and accumulating the symbols orthogonally modulated for the first symbol time duration in a unit of the second symbol.

13. The non-orthogonal noise detecting method as claimed in claim 12, wherein the difference signal generating step comprises the steps of:

delaying the second symbols; and subtracting the presently received second symbols from the delayed second symbols to generate the non-orthogonal noise component.

14. The non-orthogonal noise detecting device as claimed in claim 11, further comprising the step of down-sampling the non-orthogonal noise signal so as not to select an output generated at a boundary duration of the first symbol as a non-orthogonal noise.

15. The non-orthogonal noise detecting device as claimed in claim 11, wherein the first symbol is a sync channel symbol and the second symbol is a traffic channel symbol.

16. A non-orthogonal noise detecting method for a CDMA communication system, comprising the steps of:
- despreading multiple channel signals including a specific channel with an orthogonal code assigned thereto, said specific channel repeating the same data to generate despread repeated symbols;
- receiving the despread repeated symbols, and detecting a difference between a presently received symbol and a previously received symbol; and
- converting the difference signal to an energy value to generate a non-orthogonal noise signal.

17. The non-orthogonal noise detecting method as claimed in claim 16, further comprising the step of down-sampling the non-orthogonal noise signal.

18. A non-orthogonal noise detecting device for a CDMA communication system, comprising:
- a channel coder for coding a specific traffic channel signal being transmitted at a lower rate than other channel signals;
- a pattern inserter for inserting a specific pattern in an output of the channel coder;
- a base station device including a spreader for spreading an output of the pattern inserter with an orthogonal code for a corresponding channel;
- a despreader for despreading multiple channel signals including a specific channel with an orthogonal code assigned to the specific channel repeating at least two same second symbols in a given first symbol time duration, to generate despread repeated symbols;
- a pattern remover for removing the specific pattern from the despread signal;
- a difference signal generator for receiving the pattern-removed second symbols, and generating a difference signal between a presently received second symbol and a previously received second symbol; and
- a noise detector for converting the difference signal to an energy value to generate a non-orthogonal noise signal.

19. The non-orthogonal noise detecting device as claimed in claim 18, further comprising a down-sampler for down-sampling the non-orthogonal noise signal so as not to select an output generated at a boundary duration of the first symbol as a non-orthogonal noise.

20. The non-orthogonal noise detecting device as claimed in claim 19, wherein the first symbol is a sync channel symbol and the second symbol is a traffic channel symbol.

21. A non-orthogonal noise detecting device for a CDMA communication system, comprising:
- a despreader for despreading multiple channel signals including a specific channel with an orthogonal code assigned thereto, said specific channel repeating k same second symbols in a given first symbol time duration to generate despread repeated symbols;
- a non-orthogonal nose operator for delaying the despread second symbols by k-1, applying a predetermined gain control value to the present symbol and the (k-1) delayed second symbols, and operating the gain-controlled second symbols to generate a non-orthogonal noise component;
- a noise detector for converting the difference signal to an energy value to generate a non-orthogonal noise signal.

22. The non-orthogonal noise detecting device as claimed in claim 21, wherein the despreader comprises:
- an orthogonal demodulator for despreading the received channel signal with an orthogonal code assigned to a channel for transmitting the first symbol; and
- an accumulator for accumulating the symbols orthogonally modulated for the first symbol duration in a unit of the second symbol.

23. The non-orthogonal noise detecting device as claimed in claim 22, wherein the non-orthogonal noise operator comprises:
- (K-1) delays connected in cascade, for delaying the second symbols output from the despreader;
- gain controllers for multiplying the received second symbol and the (k-1) delayed second symbols by predetermined corresponding gain control values, wherein the sum of the gain control values is zero; and
- an adder for adding outputs of the gain controllers to generate the non-orthogonal noise component.

24. The non-orthogonal noise detecting device as claimed in claim 21, further comprising a down-sampler connected to the noise detector, for down-sampling the non-orthogonal noise signal so as not to select an output generated at a boundary duration of the first symbol as a non-orthogonal noise.

25. The non-orthogonal noise detecting device as claimed in claim 24, wherein the first symbol is a sync channel symbol and the second symbol is a traffic channel symbol.

26. A non-orthogonal noise detecting method for a CDMA communication system, comprising:
- despreading multiple channel signals including a specific channel with an orthogonal code assigned to the specific channel repeating k same second symbols in a given first symbol time duration, to generate despread repeated symbols; delaying the despread second symbols by k-1, applying a predetermined gain control value to the present symbol and the (k-1) delayed second symbols, and operating the gain-controlled second symbols to generate a non-orthogonal noise component;
- converting the difference signal to an energy value to generate a non-orthogonal noise signal.

* * * * *